US005082581A

United States Patent [19]

Yabe et al.

[11] Patent Number: 5,082,581

[45] Date of Patent: Jan. 21, 1992

[54] AQUEOUS MAGNETIC FLUID COMPOSITION AND PROCESS FOR PRODUCING THEREOF

[75] Inventors: Toshikazu Yabe, Fujisawa; Atsushi Yokouchi, Yokohama, both of Japan

[73] Assignee: Nippon Seiko Kabushiki Kaisha, Tokyo, Japan

[21] Appl. No.: 400,723

[22] Filed: Aug. 30, 1989

[51] Int. Cl.[5] .............. C04B 35/04

[52] U.S. Cl. .............. 252/62.54

[58] Field of Search .............. 252/62.54

[56] References Cited

U.S. PATENT DOCUMENTS

| | | | |
|---|---|---|---|
| 3,652,761 | 3/1972 | Weetall | 424/12 |
| 4,019,994 | 4/1977 | Kelley . | |
| 4,094,804 | 6/1978 | Shimaiizaka . | |
| 4,554,088 | 11/1985 | Whitehead et al. | 252/62.54 |
| 4,672,040 | 6/1987 | Josephson | 436/526 |
| 4,695,392 | 9/1987 | Whitehead et al. | 252/62.54 |
| 4,695,393 | 9/1987 | Whitehead et al. | 252/62.54 |
| 4,946,613 | 8/1990 | Ishikawa | 252/62.52 |

*Primary Examiner*—William R. Dixon, Jr.
*Assistant Examiner*—Alan Wright
*Attorney, Agent, or Firm*—Basile and Hanlon

[57] ABSTRACT

An aqueous magnetic fluid composition comprising water as a dispersion medium and fine ferromagnetic particles as a dispersed phase, in which a coupling agent having a hydrophilic group and at least one hydrolyzable group is chemically bonded by way of the reaction product of the hydrolyzable group to the surface of the fine ferromagnetic particles. The magnetic fluid composition is prepared by way of obtaining an intermediate medium by chemically bonding the coupling agent by way of the hydrolysis product to the fine particles and separating fine particles of poor dispersibility and evaporating the composite product of the hydrolysis and at least a portion of water.

12 Claims, No Drawings

AQUEOUS MAGNETIC FLUID COMPOSITION AND PROCESS FOR PRODUCING THEREOF

BACKGROUND OF THE INVENTION

1. Field of the Invention

The present invention concerns an aqueous magnetic fluid composition comprising fine ferromagnetic particles stably dispersed by means of a dispersant in water as a dispersion medium and a process for producing the same. More in particular, the present invention provides an aqueous magnetic fluid composition of high stability in which a dispersant is chemically bonded to the surface of fine ferromagnetic particles by utilizing hydrolysis, as well as an efficient production process therefor.

2. Description of the Relevant Art

Magnetic fluids using water as a dispersion medium in the prior art are described in, for example, Japanese Patent Publication Sho 54-40069 which corresponds to U.S. Pat. No. 4,094,804. In this publication, an aqueous magnetic fluid is produced by first forming on the surface of fine ferromagnetic oxide powder obtained by a wet process, a mono-molecular adsorption layer of a surface active agent comprising an unsaturated fatty acid or salt thereof (a first surface active agent) in an aqueous phase and, subsequently, adsorbing under orientation an anionic or nonionic type surface active agent (a second surface active agent) as the second layer thereby stably dispersing the fine ferromagnetic particles in water.

However, conventional magnetic fluids using water as the dispersing medium involve various problems as described below:

(1) Adsorption of the second surface active agent is an extremely weak physical adsorption (due to van der Waals forces caused by interaction between oleophilic groups of the first and second surface active agents). This phenomenon tends to cause easy desorption making it difficult to maintain stable dispersion of the fine ferromagnetic particles over a long period of time;

(2) The solubility of the second surface active agent is water varies depending on the temperature. Equilibrium between an excess portion present in the bulk and a portion adsorbed to the second layer of the second surface active agent greatly depends on the temperature. That is, the second surface active agent may possibly be desorbed depending on temperature changes to worsen the dispersion stability of the fine ferromagnetic particles;

(3) Since the magnetic fluid itself bubbles readily due to the excess second surface active agent present in water, handling is difficult;

(4) If a small amount of oil or polar solvent is mixed into the magnetic fluid, the surface active agent adsorbed on the second layer or the surface active agent adsorbed on the first layer may cause desorption. As a result, there is a possibility that the dispersed fine ferromagnetic particles will be precipitated or the magnetic fluid per se be emulsified.

SUMMARY OF THE INVENTION

The present invention has been accomplished in view of the foregoing problems in the prior art and it is an object thereof to overcome such problems by using a coupling agent having at least one hydrolyzable group together with a hydrophilic group as a surface active agent, and chemically bonding the coupling agent by way of a reaction product of the hydrolyzable groups and water to the surface of the fine ferromagnetic particles thereby covering the surface of the fine ferromagnetic particles which is hydrophilic by nature with less desorbing a coupling agent to disperse the particles more stably in water.

An aqueous ferromagnetic fluid composition of the present invention for attaining the above-mentioned object comprises an aqueous magnetic fluid composition using water as a dispersion medium and fine ferromagnetic particles as a dispersed phase, wherein a coupling agent having a hydrophilic group and at least one hydrolyzable group is chemically bonded to the surface of the fine ferromagnetic particles by way of a reaction product derived from the hydrolyzable group.

The hydrolyzable group of the coupling agent is, preferably, an alkoxy group.

A process for producing the aqueous magnetic fluid according to the present invention comprises a step of adding water and a coupling agent having a hydrophilic group and at least one hydrolyzable group to fine ferromagnetic particles to hydrolyze the hydrolyzable group of the coupling agent and chemically bonding the coupling agent by way of the hydrolysis reaction product to the surface of the fine ferromagnetic particles to obtain an intermediate medium in which the fine ferromagnetic particles are uniformly dispersed in an aqueous dispersion medium and a step of separating composite products of the hydrolyzing reaction and at least a portion of the water by evaporation.

In another feature of the present invention, the production process comprises the steps of adding water and a coupling agent having a hydrophilic group and at least one hydrolyzable group and chemically coupling the coupling agent to the surface of fine ferromagnetic particles and, directly, heating them to a temperature higher than the boiling point of water to obtain fine ferromagnetic particles the surface of which is coated with the coupling agent. The process also comprises the step of adding water to the fine ferromagnetic particles to form a mixture and a step of separating fine ferromagnetic particles of poor dispersibility in the mixture.

The fine ferromagnetic particles as a dispersed phase have —OH groups at the surface thereof. On the other hand, the coupling agent is hydrolyzed in water at the hydrolyzable group on one end of the molecule thereof to produce an —OH group. Dehydration condensation takes place between the —OH group formed by hydrolysis and the —OH group at the surface of the fine ferromagnetic particles. Thus, the coupling agent is firmly bonded chemically to the surface of the particles, while it covers the surface of the particles with the hydrophilic group on the opposite side being directed to the outerside of the particles. As a result, the fine ferromagnetic particles are dispersed extremely stably in water as the dispersion medium.

DESCRIPTION OF THE PREFERRED EMBODIMENTS

Explanation is to be made specifically referring to the magnetic fluid composition and the production process therefor according to the present invention.

The dispersant for the fine ferromagnetic particles in the present invention is different from conventional surface active agents comprising a polar group acting as a hydrophilic group and a non-polar group acting as an oleophilic (hydrophobic group) in its structure in view of the way of bonding with the fine particles and in the operation mechanism.

A silane coupling agent represented, for example, by the general formula $YRSiX_n$ is used as the dispersant of the present invention. In the above formula, $n=1\text{-}3$, X represents a hydrolyzable group consisting of an alkoxy group, such as methoxy ($CH_3O$—) or ethoxy ($C_2H_5O$—), R represents ethylenediamine or other similar hydrocarbon chain, Y represents a hydrophilic group selected from the group consisting of a basic salt of carboxylic acid, quaternary ammonium salts and mixtures thereof and isothiouronium salt. The hydrophilic group may be one or two groups selected from the group consisting of anionic, cationic, nonionic groups and mixtures thereof.

Examples of the preferred silane coupling agent are, preferably, as shown below (1) N-[(3-trimethoxysilyl)propyl] ethylenediamine triacetic acid, trisodium salt

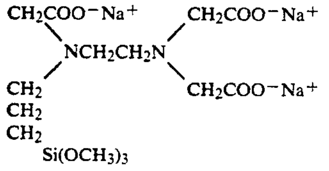

(2) Trimethoxysilylpropyl isothiouronium chloride

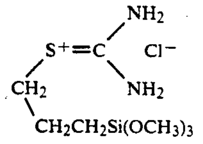

(3) N-trimethoxysilylpropyl tri-N-butylammonium bromide

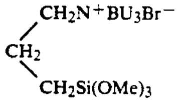

(BU: $-CH_2CH_2CH_2CH_3$)

In the silane coupling agent, the alkoxy group X is hydrolyzed to form a silanol group, that is $YRSi(OH)_n$ in an aqueous solution, with moisture in air or water adsorbed to the surface of inorganic material. On the other hand, fine ferromagnetic particles M has an —OH group at the surface (M—OH). Without being bound to any theory it is believed that a dehydration condensation reaction takes place between them to form chemical bonding by way of metasiloxane bonding (Si—O—M). The optimal amount of the coupling agent added in the present invention as the dispersant is an amount sufficient to completely cover the surface of the fine ferromagnetic particles with a monomolecular layer. Accordingly, the amount can be calculated from the following equation based on the minimum covering area of the coupling agent to the fine ferromagnetic particles and the surface area of the fine ferromagnetic particles:

$$\text{Addition amount of coupling agent} = \frac{\left(\begin{array}{c}\text{weight of fine}\\ \text{ferromagnetic}\\ \text{particles}\end{array} \times \begin{array}{c}\text{Specific}\\ \text{surface}\\ \text{area}\end{array}\right)}{\text{Minimum covering area of the coupling agent}}$$

The extent of the minimum covering area of the coupling agent is, for example, 13Å as the area per one molecule in the case of the silane coupling agent. Accordingly, the area per one gram is determined as $(13\,\text{Å}\times 6.02\times 10^{23})$/molecular weight, in which $6.02\times 10^{23}$ represents Avogadro's number.

In the actual step, an appropriate amount of the silane coupling agent is added considering the specific surface area and the water content of the fine ferromagnetic particles, and the hydrolyzability and the difference of the film-forming state of silane, and the added amount is controlled by examining the actual state of processing.

The fine ferromagnetic particles in the present invention may be those obtained by a well-known wet process in which an aqueous colloidal suspension (slurry) may be used. In the wet process, an alkali is added to an acidic solution containing ferrous ions and ferric ions at a 1:2 ratio to adjust the pH to about 9 or higher and the particles are aged under an appropriate temperature to obtain magnetite colloid. Further, fine ferromagnetic particles obtained by a so-called wet pulverization process in which magnetite powder is ball milled in water or organic solvent may also be used. Furthermore, fine ferromagnetic particles obtained by a dry process may also be used.

In addition to magnetite, fine ferromagnetic particles of nickel ferrite, cobalt ferrite, composite ferrite comprising them together with zinc or barium ferrite, as well as fine ferromagnetic metal particles, such as of iron or cobalt may also be used.

The content of the fine ferromagnetic particles may be adjusted within a usual range of 1 to 20% by volume, as well as to a higher concentration when they are prepared by way of an intermediate medium using water as the solvent.

In the process steps of the present invention, water and the coupling agent are at first added to the ferromagnetic particles to hydrolyze the hydrolyzable group thereof and the coupling agent is chemically bonded by way of the reaction product to the surface of the fine ferromagnetic particles to obtain an intermediate medium. Then, particles of poor dispersibility in the intermediate medium are centrifugally removed and, subsequently, water and alcohol as a hydrolysis product in the intermediate medium are dried under a reduced pressure. Then, water as the dispersion medium is added thereto to obtain an aqueous magnetic fluid at a required concentration. Alternately, the centrifuged intermediate medium is heated under a reduced pressure to evaporate the alcohol as the hydrolysis product and a portion of water is used to obtain an aqueous magnetic fluid concentrated to a predetermined concentration.

Alternately, the intermediate medium may be dried once by heating under a reduced pressure before being subjected to centrifuging. Water is then added to the dried particles to form a dispersion, which is then subjected to centrifugation to remove particles of poor dispersibility. Furthermore, an aqueous magnetic fluid at high concentration may be obtained by separating and removing particles of poor dispersibility as described above, drying the remaining products once and, then, adding a predetermined amount of water, or heating to concentrate without drying.

In this way, it is possible to obtain an aqueous magnetic fluid in which the coupling agent is bonded by way of metasiloxane bonding with the alkoxy group thereof to the surface of the fine ferromagnetic particles and covers the surface with a monomolecular layer coating with the hydrophilic group being directed outwardly.

In order to explain the present invention more specifically reference is made to the following illustrative examples. These examples are included for illustrative purpose and are not to be considered as limitative of the present invention.

EXAMPLE 1

Initially, 6N aqueous solution of NaOH was added to one liter of an aqueous solution containing ferrous sulfate and ferric sulfate each by 0.3 mol until the pH is increased to higher than 11 and, thereafter, the solution was aged at 60° C. for 30 min to obtain a slurry of magnetite colloid. Then, electrolytes in the slurry were removed by water washing at room temperature. This is a wet process for producing magnetite colloid. The magnetite colloid solution thus obtained was centrifuged to collect magnetite, which was then dried at 8020 C. for 3 hours under a reduced pressure.

To 5.0 g of the thus dried fine magnetite particles, 3.0 g of N-[(3-trimethoxysilyl)propyl] ethylenediamine triacetic acid, trisodium salt as a dispersant and 12.0 g of water were added, pulverized, and dispersed for 4 hours by using a ball mill. In this way, the fine magnetite particles were covered at the surface thereof with the silane coupling agent and were stably dispersed in water to form an intermediate medium.

The intermediate medium was processed in a centrifuge under 8,000G of centrifugal force for 30 min to remove particles of relatively large diameter and poor dispersibility by settling from the dispersed magnetite particles. Then, the supernatant liquid in which non-precipitated fine magnetite particles were suspended was transferred to a rotary evaporator and maintained at 50° C. to remove methanol formed by hydrolysis of the silane coupling agent and water by evaporization.

Further, water is removed from the transferred material through evaporation by drying at 80° C. under a reduced pressure to obtain fine magnetite particles coated, with the silane coupling agent. Then, fresh water was added by 80 wt % of the fine magnetite particles such that the magnetite particles were dispersed again in water. The dispersion was again subjected to centrifugation and processed for 30 min under 8,000G of centrifugal force. Non-dispersed solid matters were removed by the centrifugation. The resulting colloidal solution was an extremely stable magnetic fluid.

EXAMPLE 2

Magnetite colloid was prepared by the wet process in the same procedures as those in Example 1, and further dried under a reduced pressure. 7.6 g of trimethoxysillypropyl isothiouronium chloride as the silane coupling agent and 12.0 g of water were added to 8.0 g of the dried fine magnetite particles. The mixture was pulverized and dispersed using a ball mill for 4 hours. In this way, an intermediate medium was obtained in which the surfaces of fine magnetite particles were covered with the silane coupling agent. This intermediate medium was stably dispersed in water.

Then, the intermediate medium was transferred to a rotary evaporator and maintained at 90° C. to evaporate methanol formed by hydrolysis of the silane coupling agent and water.

Subsequently, 20 g of water was added to disperse the particles again. This solution was then subjected to a centrifuge and processed at 8,000G of centrifugal force for 30 min. Particles of relatively large grain size and poor dispersibility were removed by settling from the dispersed magnetite particles.

The magnetic fluid obtained was extremely stable.

According to the present invention, the ferromagnetic fluid is stably dispersed in an aqueous dispersion medium by using a coupling agent having a hydrophilic group on one end and a hydrolyzable group on the other end in the molecular structure thereof as a dispersant, and chemically bonding it by way of the reaction product of the hydrolyzable group of the coupling agent to the surface of the ferromagnetic particles. Accordingly, contrary to the conventional ferromagnetic fluid in which the dispersant is merely adsorbed physically o n the surface of the fine ferromagnetic particles, the dispersant in the present invention does not easily desorb when exposed to temperature changes, intrusion of a polar solvent or a small amount of objectional material, such as oil, and can even remain in a satisfactory dispersed state for a long period of time.

In addition, since the dispersant is added in such an amount as to form a monomolecular layer on the surface of the fine ferromagnetic particles, it can provide the effect of preventing bubbling of the magnetic fluid per se caused by the presence of excess surface active agent present in the water thereby facilitating the handling of the magnetic fluid.

What is claimed is:

1. An aqueous magnetic fluid composition comprising:

a dispersion medium consisting essentially of water;

a dispersed system consisting essentially of fine ferromagnetic particles with a silane coupling agent chemically bonded to the surface of said fine ferromagnetic particles, said silane coupling agent having:

a hydrophilic group selected from the group consisting of a salt of carboxylic acid, a quaternary ammonium salt, an isothiouronium salt, and mixtures thereof; and at least one hydrolyzable group;

wherein said chemical bonding is accomplished by way of metasiloxane bonding, said metasiloxane bonding derived from dehydration condensation between said hydrolyzable group and said fine ferromagnetic particles.

2. The aqueous magnetic fluid composition set forth in claim 1 wherein said silane coupling agent is represented by the general formula:

$$(Y_pR)_{4-n}SiX_n$$

wherein X represents said hydrolyzable group, Y represents said hydrophilic group, R represents a hydrocarbon chain, p is an integer not less than 1 and n is an integer between 1 and 3.

3. The aqueous magnetic fluid composition set forth in claim 2 wherein said hydrolyzable group X consists of an alkoxy group having one or two carbon atoms, said alkoxy group being bonded to silicon, the alkoxy group being hydrolyzed to form a silanol group, with subsequent dehydration condensation taking place between said silanol group and hydroxyl groups present on the surface of said fine ferromagnetic particles so as to form metasiloxane bonds.

4. The aqueous magnetic fluid composition set forth in claim 1 wherein said silane coupling agent is selected from the group consisting of N-[(3-trimethoxysilyl) propyl] ethylendiane triacetic acid trisodium salt, trimethoxysilylpropyl isothiouronium chloride, N-trimethoxysilylpropyl tri-N-butylammonium bromide, and mixtures thereof.

5. A process for producing an aqueous magnetic fluid composition comprising the steps of:

producing an intermediate medium in which fine ferromagnetic particles are dispersed homogeneously in an aqueous dispersion medium by addition of water and a silane coupling agent to fine ferromagnetic particles, said silane coupling agent having at least one hydrolyzable group and a hydrophilic group selected from the group consisting of a salt of carboxylic acid, a quaternary ammonium salt, an isothiouronium salt, and mixtures thereof, followed by hydrolysis of said hydrolyzable group to form a hydrolyzate, and dehydration condensation taking place between said hydrolyzate and hydroxyl groups present on said fine ferromagnetic particles to form a chemical bond between said hydrolyzate and said fine ferromagnetic particles;

separating poorly dispersible fine ferromagnetic particles from said intermediate medium; and evaporating from the composition at least a portion of said water and a secondary reaction product produced by said hydrolysis of said hydrolyzable group.

6. The process of producing an aqueous magnetic fluid composition of claim 5 wherein said silane coupling agent is represented by the general formula:

$$(Y_pR)_{4-n}SiX_n$$

wherein X represents said hydrolyzable group, Y represents said hydrophilic group, R represents a hydrocarbon chain, p is an integer not less than 1 and n is an integer between 1 and 3.

7. The process of claim 6 wherein said hydrolyzable group X is an alkoxy group selected from the group consisting of methoxy groups, ethoxy groups, and mixtures thereof, wherein said hydrolyzate is a silanol group, and said chemical bond formed is a metasiloxane bond.

8. The process of claim 7 wherein said silane coupling agent is selected from the group consisting of N-[(3-trimethoxysilyl)propyl]ethylene diamine triacetic acid trisodium salt, trimethoxysilyl propyl isothiouronium.

9. A process for producing an aqueous magnetic fluid composition comprising the steps of:

admixing a first portion of water and a silane coupling agent with fine ferromagnetic particles, said silane coupling agent having at least one hydrolyzable group and a hydrophilic group selected from the group consisting of a salt of carboxylic acid, a quaternary ammonium salt, an isothiouronium salt, and mixtures thereof;

chemically bonding said silane coupling agent to said fine ferromagnetic particles by dehydration condensation between a hydrolyzate of said hydrolyzable group and hydroxyl groups present on the surface of said fine ferromagnetic particles;

directly heating said fine ferromagnetic particles to a temperature higher than the boiling point of water to obtain fine ferromagnetic particles having surfaces covered with said coupling agent;

adding a second portion of water to said ferromagnetic particles to form a mixture; and separating poorly dispersible fine ferromagnetic particles from said mixture.

10. The process of claim 9 wherein said silane coupling agent is represented by the general formula:

$$(Y_pR)_{4-n}SiX_n$$

wherein X represents said hydrolyzable group, Y represents said hydrophilic group, R represents a hydrocarbon chain, p is an integer not less than 1 and n is an integer between 1 and 3.

11. The process of claim 10 wherein said hydrolyzable group X is an alkoxy group selected from the group consisting of methoxy groups, ethoxy groups and mixtures thereof, wherein said hydrolyzate is a silanol group, and said chemical bond formed is a metasiloxane bond.

12. The process of claim 9 wherein said silane coupling agent is selected from the group consisting of N-[(3-trimethoxysilyl)propyl]ethylene diamine triacetic acid trisodium salt, trimethoxysilyl propyl isothiouronium, N-trimethoxysilypropyl, tri-N-butylammonium bromide and mixtures thereof.

* * * * *